United States Patent
Okutsu

(10) Patent No.: US 8,254,129 B2
(45) Date of Patent: Aug. 28, 2012

(54) ELECTRONIC APPARATUS

(75) Inventor: Isao Okutsu, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 60 days.

(21) Appl. No.: 12/630,574

(22) Filed: Dec. 3, 2009

(65) Prior Publication Data

US 2010/0246125 A1    Sep. 30, 2010

(30) Foreign Application Priority Data

Mar. 30, 2009    (JP) .................................. 2009-082334

(51) Int. Cl.
*H05K 7/20*    (2006.01)

(52) U.S. Cl. ........ 361/719; 361/707; 361/715; 361/717; 361/720; 165/80.3; 165/104.33; 257/713; 257/719

(58) Field of Classification Search .................. 361/688, 361/704, 707, 709, 710, 715, 717, 719, 720; 361/721–722, 752
See application file for complete search history.

(56) References Cited

U.S. PATENT DOCUMENTS

| | | | |
|---|---|---|---|
| 6,865,082 B2 * | 3/2005 | Huang et al. .................. | 361/700 |
| 7,310,227 B2 * | 12/2007 | Kusamoto et al. ............ | 361/695 |
| 7,426,112 B2 * | 9/2008 | Chi-Wei et al. ............... | 361/700 |
| 7,486,518 B2 * | 2/2009 | Tomioka ........................ | 361/718 |
| 7,602,610 B2 * | 10/2009 | Ueda .............................. | 361/701 |
| 7,885,075 B2 * | 2/2011 | Li et al. ......................... | 361/701 |
| 2005/0117307 A1 * | 6/2005 | Tanaka .......................... | 361/719 |
| 2008/0037227 A1 | 2/2008 | Fujiwara | |
| 2008/0232063 A1 * | 9/2008 | Koo ............................... | 361/687 |
| 2008/0239667 A1 * | 10/2008 | Tanaka .......................... | 361/695 |
| 2008/0296047 A1 | 12/2008 | Kaji | |
| 2010/0002388 A1 | 1/2010 | Tanaka | |

FOREIGN PATENT DOCUMENTS

| | | |
|---|---|---|
| JP | 07-086718 | 3/1995 |
| JP | 2006-210852 | 8/2006 |
| JP | 2006-216944 | 8/2006 |
| JP | 2007-310716 | 11/2007 |
| JP | 2008-010768 | 1/2008 |
| JP | 2008-251687 | 10/2008 |
| JP | 2008-294348 | 12/2008 |

OTHER PUBLICATIONS

Japanese Patent Application No. 2009-082334, Notice of Reasons for Refusal, mailed Apr. 13, 2010, (with English Translation).

* cited by examiner

*Primary Examiner* — Courtney Smith

(74) *Attorney, Agent, or Firm* — Blakely, Sokoloff, Taylor & Zafman LLP

(57) ABSTRACT

An electronic apparatus includes: a housing; a circuit board accommodated in the housing; a face mounting component mounted on the circuit board; a heating component mounted on the circuit board; a reinforcing member having a thermal conductivity and configured to reinforce a region on the circuit board on which the face mounting component is mounted; and a radiation unit extended from the reinforcing member and connected thermally to the heating component.

9 Claims, 10 Drawing Sheets

ELECTRONIC APPARATUS

CROSS-REFERENCE TO RELATED APPLICATIONS

This application is based upon and claims the benefit of priority from Japanese Patent Application No. 2009-082334, filed on Mar. 30, 2009, the entire contents of which are incorporated herein by reference.

BACKGROUND

1. Field

An aspect of the present invention relates to an electronic apparatus.

2. Description of the Related Art

A use of a reinforcing plate has widely spread in order to suppress a stress applied to a solder portion of a surface mounting component such as a Ball Grid Array (BGA) package when mounting the surface mounting component on a circuit board.

For example, JP-A-2006-210852 discloses a circuit board which has a greater outer edge dimension than an outer edge dimension of a surface mounting type circuit component and has a reinforcing plate attached to a region of a circuit board body on which the surface mounting type circuit component is mounted.

However, in the circuit board disclosed in JP-A-2006-210852, it is not considered that a mounting configuration of a reinforcing plate or a material of the reinforcing plate is utilized to efficiently cool heat generated from an electronic component.

BRIEF DESCRIPTION OF THE SEVERAL VIEWS OF THE DRAWINGS

A general architecture that implements the various feature of the present invention will now be described with reference to the drawings. The drawings and the associated descriptions are provided to illustrate embodiments of the present invention and not to limit the scope of the present invention.

DETAILED DESCRIPTION

Various embodiments according to the present invention will be described hereinafter with reference to the accompanying drawings. In general, according to one embodiment of the present invention, there is provided an electronic apparatus including: a housing; a circuit board accommodated in the housing; a face mounting component mounted on the circuit board; a heating component mounted on the circuit board; a reinforcing member having a thermal conductivity and configured to reinforce a region on the circuit board on which the face mounting component is mounted; and a radiation unit extended from the reinforcing member and connected thermally to the heating component.

Embodiments according to the invention will be described below with reference to the drawings applied to a portable computer.

Figure 1:
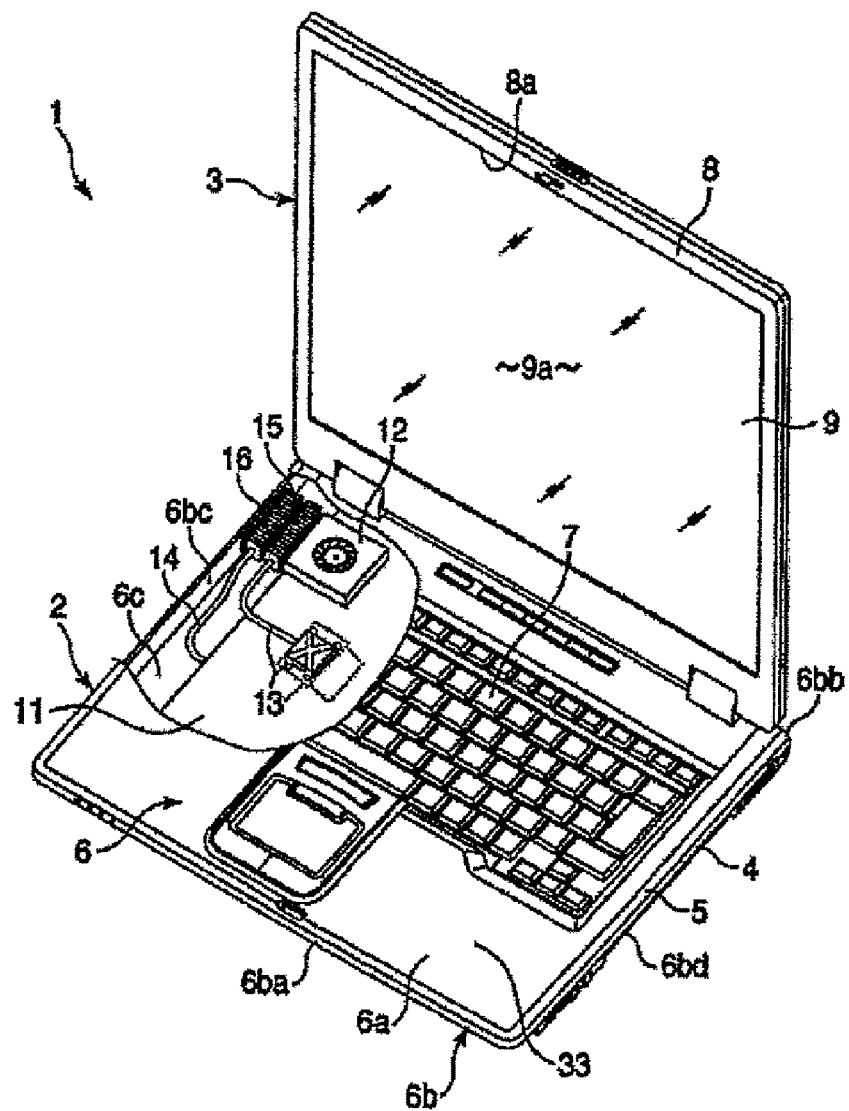
FIG. 1 is an exemplary perspective view showing a portable computer according to a first embodiment of the invention.

FIGS. 1 to 7 disclose a portable computer 1 serving as an electronic apparatus according to a first embodiment of the invention. As shown in FIG. 1, the portable computer 1 includes a body 2 and a display unit 3.

The body 2 includes a body base 4 and a body cover 5. The body cover 5 is combined with the body base 4 from above. The body 2 includes a housing 6 formed to take a shape of a box in cooperation of the body base 4 and the body cover 5 with each other. The housing 6 has an upper wall 6a, a peripheral wall 6b and a lower wall 6c. The upper wall 6a supports a keyboard 7. The peripheral wall 6b has a front peripheral wall 6ba, a rear peripheral wall 6bb, a left peripheral wall 6bc and a right peripheral wall 6bd.

The display unit 3 includes a display housing 8 and a liquid crystal display panel 9 accommodated in the display housing 8. The liquid crystal display panel 9 has a display screen 9a. The display screen 9a is exposed to an outside of the display housing 8 through an opening portion 8a on a front of the display housing 8.

The display unit 3 is supported on a rear end of the housing 6 through a hinge device. Consequently, the display unit 3 is rotatable between a closing position in which it is pulled down to cover the upper wall 6a from above and an opening position in which it is pulled up to expose the upper wall 6a.

Figure 2:
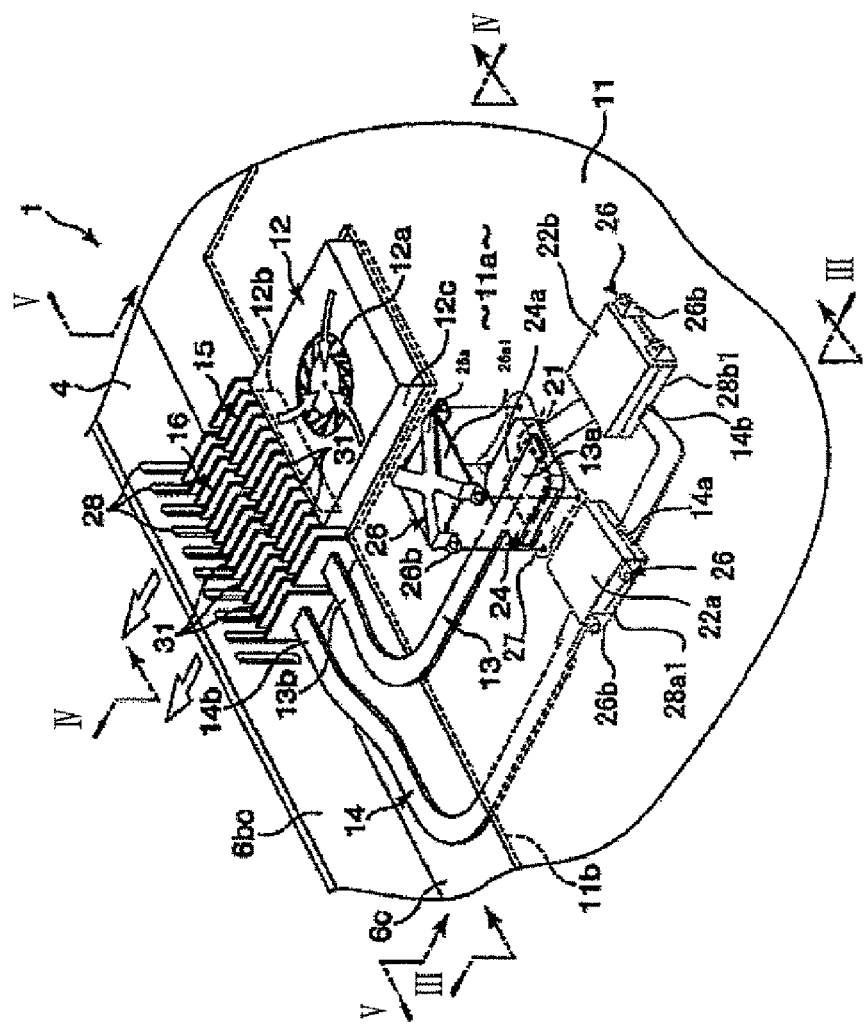
FIG. 2 is an exemplary perspective view showing an inner part of a housing of the portable computer according to the first embodiment.

As shown in FIG. 2, the housing 6 accommodates a circuit board 11, a cooling fan 12, first and second heat pipes 13 and 14, and first and second radiation members 15 and 16.

The circuit board 11 has a first face 11a and a second face 11b. An example of the first face 11a is an upper face of the circuit board 11, for example. The first face 11a is opposed to the upper wall 6a and is a so-called face. An example of the second face 11b is a lower face of the circuit board 11, for example, and is formed on a back side of the first face 11a. The second face 11b is opposed to the lower wall 6c and is a so-called back face.

A first heating component 21 is mounted on the first face 11a of the circuit board 11, for example. Second heating components 22a and 22b are mounted on the second face 11b of the circuit board 11, for example. A plurality of other circuit components (not shown) is mounted on the circuit board 11. The heating components 21, 22a and 22b particularly have large heating amounts in the circuit components to be mounted on the circuit board 11.

Examples of each of the heating components 21, 22a and 22b include an electronic component such as a Central Processing Unit (CPU) board or a semiconductor package having a bump, for instance, a Ball Grid Array (BGA) and a Chip Size Package (CSP), a graphics chip, various chip sets and a memory. The heating component to which the embodiment according to the invention can be applied is not restricted to the examples. Various electronic components desired to be radiated correspond to the heating components 21, 22a and 22b. The first and second heating components 21, 22a and 22b are disposed on the front peripheral wall 6ba side of the portable computer, that is, closer to the peripheral wall on a user side as compared with the cooling fan 12, for instance.

Figure 3:
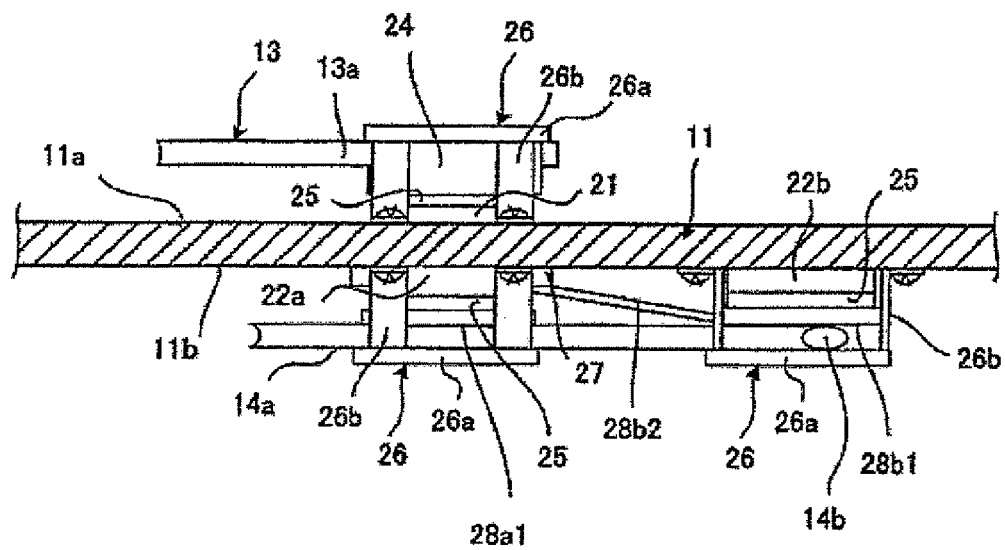
FIG. 3 is an exemplary sectional view taken along III-III line in a circuit board illustrated in FIG. 2.

As shown in FIGS. 2 and 3, a heat receiving portion 13a of the first heat pipe 13 is attached to the first heating component 21. The first heat pipe 13 is an example of a first heat transferring member. Heat receiving portions 14a and 14b of the second heat pipe 14 are attached to the second heating components 22a and 22b. The second heat pipe 14 is an example of a second heat transferring member. The first heat pipe 13 is thermally connected to the first heating component 21 through a heat receiving block 24. The second heat pipe 14 is thermally connected to the second heating components 22a and 22b through radiation units 28a1 and 28b1 of a reinforcing plate 27. A groove 24a is formed on the heat receiving pipe in an extending direction of the first heat pipe 13, for example. The heat receiving block 24 is formed of a metal, for example, and has a high thermal conductivity. The reinforcing plate 27 and the radiation units 28a1 and 28b1 will be described below with reference to FIGS. 6 to 8.

The heat receiving portion 13a of the first heat pipe 13 is fitted in the groove 24a of the heat receiving block 24, for example. More specifically, the first heat pipe 13 is caulked into the groove 24a. The heat receiving portions 14a and 14b of the second heat pipe 14 are soldered to the radiation units 28a1 and 28b1, for example. The heat receiving block 24 is mounted on the first heating component 21 with a heat transferring member 25 interposed between the heat receiving block 24 and the first heating component 21. The radiation units 28a1 and 28b1 are mounted on the second heating components 22a and 22b with the heat transferring member 25 interposed between the radiation units 28a1 and 28b1 and the second heating components 21, 22a and 22b, respectively. Examples of the heat transferring member 25 include a grease and a heat transferring sheet.

As shown in FIG. 2, the heat receiving block 24 and the radiation units 28a1 and 28b1 are fixed to the circuit board 11 by using a fixture 26. The fixture 26 has a pressing spring portion 26a for supporting the heat receiving block 24 and the radiation units 28a1 and 28b1 respectively, and a leg portion 26b extended from the pressing spring portion 26a toward the circuit board 11 and screwed into the circuit board 11. In the case in which the heat pipe is caulked into the heat receiving block 24, a cover 26a1 may be provided between the pressing spring portion 26a and the heat pipe 13 and heat receiving block 24 as shown in FIG. 2, for example. Thus, it is possible to hold the heat pipe 13 in the mounting position of the heat receiving block 24 more strongly. In the example, thus, the heat receiving block 24 and radiation units 28a1 and 28b1 and the heat pipes 13 and 14 are interposed between the circuit board 11 and the fixture 26 so that their positions are fixed.

A method of attaching the heat pipes 13 and 14 is not restricted to fitting but another method such as soldering may be employed, for example.

Figure 4:
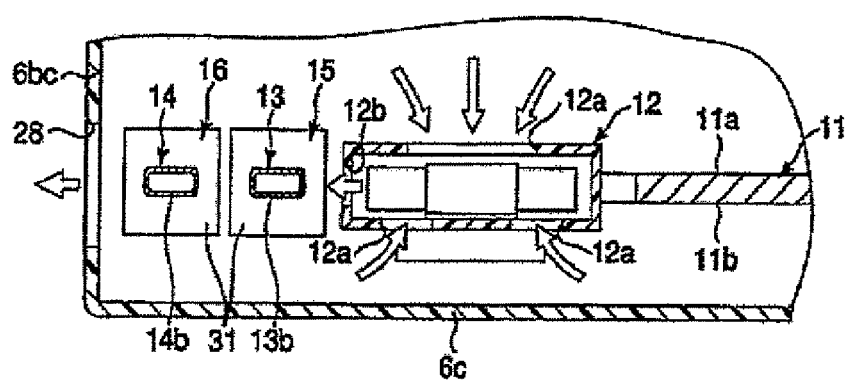
FIG. 4 is an exemplary sectional view taken along IV-IV line in the portable computer illustrated in FIG. 2.

As shown in FIG. 2, the cooling fan 12 is disposed in the vicinity of a left peripheral wall 6bc in the housing 6. The circuit board 11 is taken away in such a manner that a portion corresponding to the cooling fan 12 keeps away from the cooling fan 12. More specifically, as shown in FIG. 4, the cooling fan 12 is provided in a position shifted from the circuit board 11 and is offset from the circuit board 11. The cooling fan 12 is disposed side by side with the circuit board 11 in a parallel direction with a substrate face of the circuit board 11 (for example, a horizontal direction in the embodiment).

For example, a plurality of vent holes 28 is provided on the left peripheral wall 6bc of the housing 6 corresponding to the cooling fan 12. The vent hole 28 is opened to an outside of the housing 6. The cooling fan 12 has inlets 12a for sucking air and a vent 12b for discharging the sucked air. The inlets 12a are opened to upper and lower faces of the cooling fan 12, for example. The vent 12b is opened to a side face of the cooling fan 12 and is opposed to the vent holes 28 of the left peripheral wall 6bc. The cooling fan 12 discharges air toward the vent holes 28.

The first and second radiation members 15 and 16 are provided in the vicinity of the left peripheral wall 6bc of the housing 6 which is disposed out of the circuit board 11. In detail, as shown in FIG. 2, both of the first and second radiation members 15 and 16 are disposed between the vent 12b of the cooling fan 12 and the vent holes 28 of the left peripheral wall 6bc. Both of the first and second radiation members 15 and 16 are extended in parallel with each other in such a direction as to cross an air discharging direction of the cooling fan 12. The first and second radiation members 15 and 16 are longitudinally disposed side by side with each other in an air flowing direction. In the embodiment, the first radiation member 15 is disposed between the second radiation member 16 and the cooling fan 12, for example.

As an example, the first and second radiation members 15 and 16 are formed by collecting a plurality of fin elements 31. The fin elements 31 are plate-shaped members formed to take a rectangular shape, for example. The fin element 31 is formed of a metal having a high thermal conductivity, for example, aluminum. The fin elements 31 are provided at an interval therebetween, and the plate faces thereof are disposed in the air flowing direction from the cooling fan 12.

The first heat pipe 13 is extended from the heat receiving portion 13a attached to the first heating component 21 toward the left peripheral wall 6bc of the housing 6 along the first face 11a of the circuit board 11. As described above, the first heating component 21 is positioned on the front peripheral wall 6ba side of the housing 6 as compared with the cooling fan 12. The cooling fan 12 has a side face 12c on a front side which is opposed to the front peripheral wall 6ba of the hosing 6. The first heat pipe 13 is extended along a side face 12c on a front side of the cooling fan 12.

Figure 5:
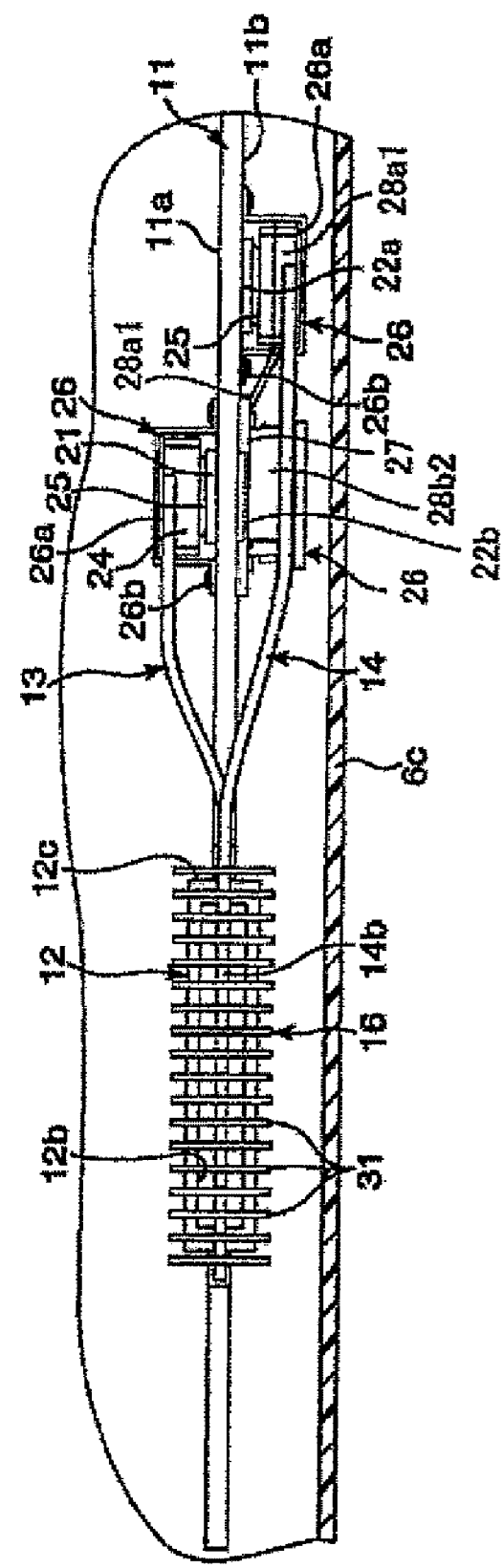
FIG. 5 is an exemplary sectional view taken along V-V5 line in the portable computer illustrated in FIG. 2.

The first heat pipe 13 extended out of the circuit board 11 is bent toward the first radiation member 15. As shown in FIG. 5, the first heat pipe 13 bent toward the first radiation member 15 is bent toward a center in a vertical direction of the first radiation member 15. More specifically, the first radiation member 15 is bent toward the lower wall 6c of the housing 6.

A tip portion of the first heat pipe 13 is extended along the vent 12b of the cooling fan 12, and furthermore, pierces the fin elements 31. In other words, the fin elements 31 having openings on the centers are fitted in the first heat pipe 13 respectively so that the first radiation member 15 is formed.

More specifically, the first heat pipe 13 is provided between the first heating component 21 and the first radiation member 15. The heat receiving portion 13a of the first heat pipe 13 is thermally connected to the first heating component 21. The other end 13b of the first heat pipe 13 is thermally connected to the first radiation member 15. The first heat pipe 13 has operating fluid therein and utilizes vaporization heat and capillarity to move heat between both of the ends 13a and 13b. The first heat pipe 13 transmits, to the first radiation member 15, heat generated by the first heating component 21.

The second heat pipe 14 is extended from the heat receiving portions 14a and 14b attached to the second heating components 22a and 22b toward the left peripheral wall 6bc of the housing 6 along the second face 11b of the circuit board 11. As described above, the second heating components 22a and 22b are positioned on the front peripheral wall 6ba side of the housing 6 as compared with the cooling fan 12. The second heat pipe 14 is extended along the side face 12c on the front side of the cooling fan 12.

The second heat pipe 14 extended out of the circuit board 11 is bent toward the second radiation member 16. As shown in FIG. 5, the second heat pipe 14 bent toward the second radiation member 16 is bent toward a center in a vertical direction of the second radiation member 16. More specifically, the second radiation member 16 is bent toward the upper wall 6a of the housing 6. A tip portion of the second heat pipe 14 is extended along the vent 12b of the cooling fan 12, and furthermore, pierces the fin elements 31. The fin elements 31 are fitted in the second heat pipe 14 respectively so that the second radiation member 16 is formed.

The second heat pipe 14 is provided among the second heating component 22a, the second heating component 22b and the second radiation member 16. The heat receiving portions 14a and 14b of the second heat pipe 14 are thermally connected to the second heating components 22a and 22b, respectively. The other end 14b of the second heat pipe 14 is thermally connected to the second radiation member 16. The second heat pipe 14 transmits, to the second radiation member 16, heat generated by the second heating components 22a and 22b.

The first and second heat pipes 13 and 14 are used in a state in which a heat pipe of $\phi 6$ is pressed in a vertical direction to have a thickness of approximately 3 mm in order to increase an installation area for the heat receiving block 24 or the radiation units 28a1 and 28b1, for example.

Both of the first and second heat pipes 13 and 14 are extended along the same side face 12c of the cooling fan 12. For example, as viewed from above the housing 6, the first and second heat pipes 13 and 14 draw tracks which are almost identical to each other.

Figure 6:
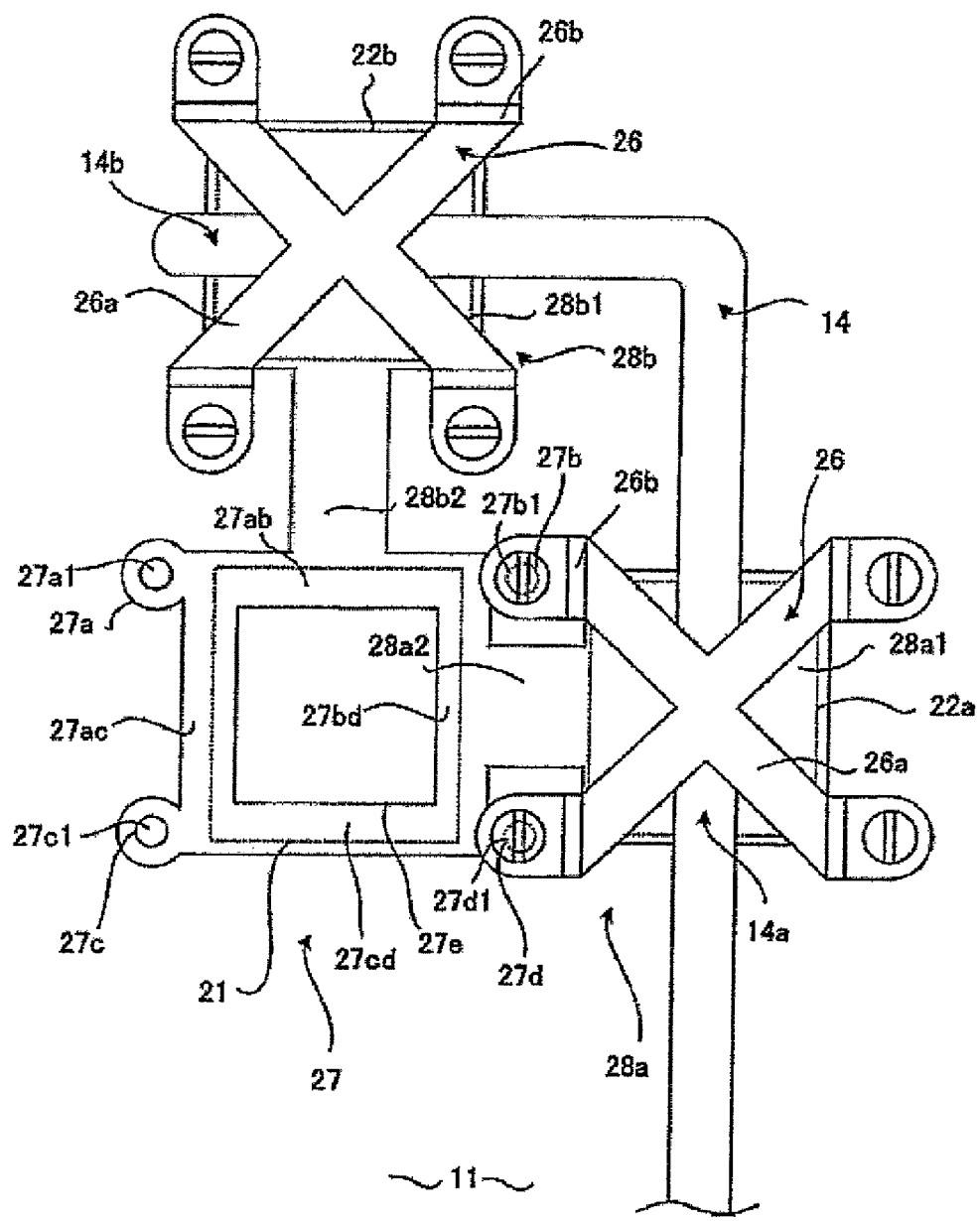
FIG. 6 is an exemplary typical plan view showing an inner part of a display unit of the portable computer according to the first embodiment.
Figure 7:
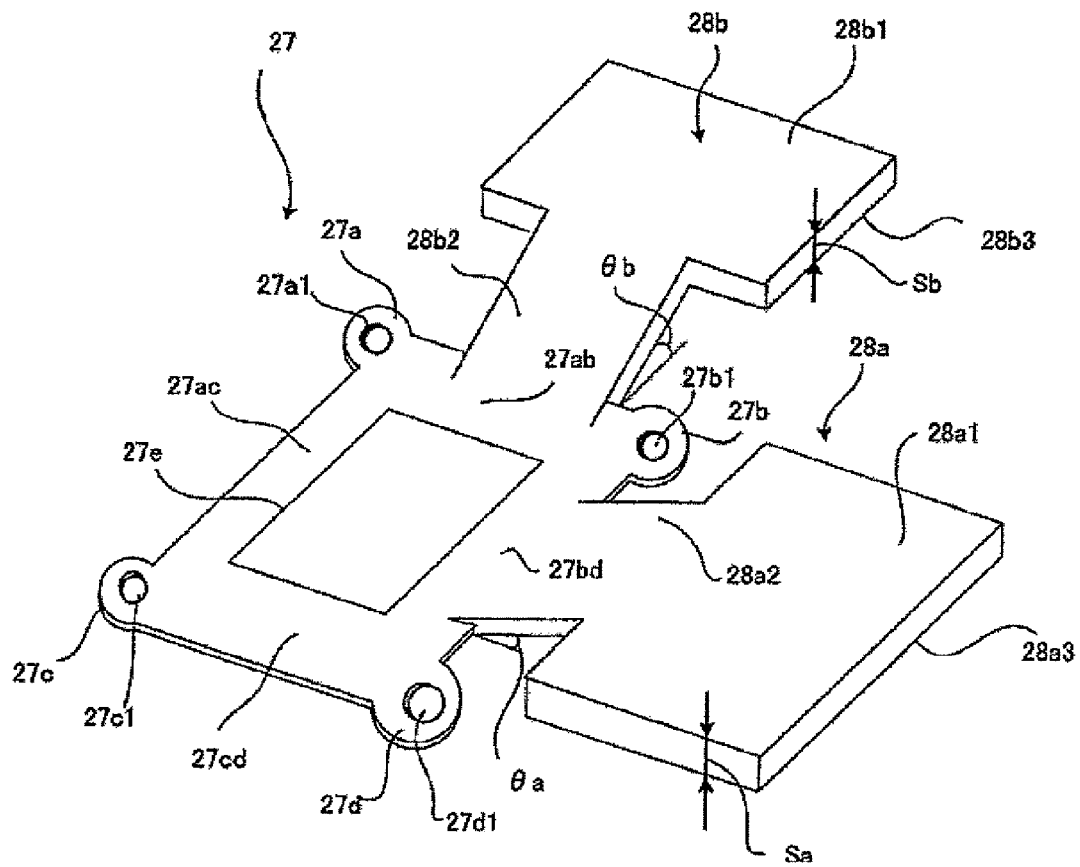
FIG. 7 is an exemplary view showing a reinforcing plate according to the first embodiment.
Figure 8:
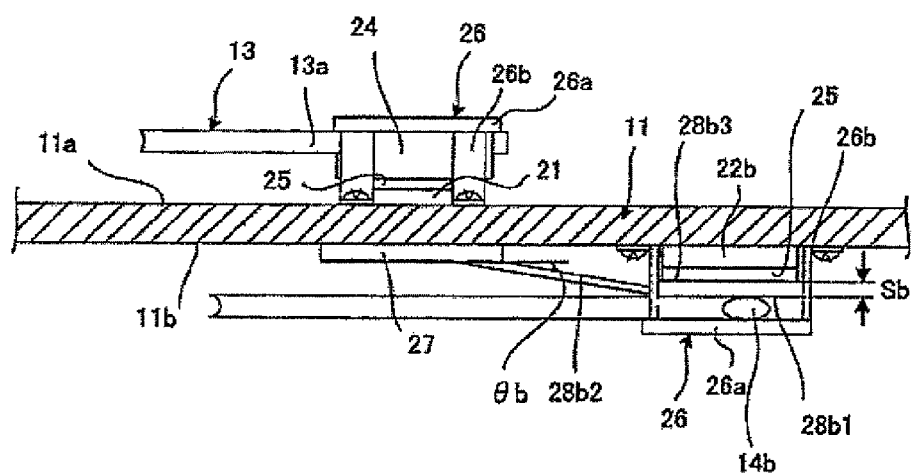
FIG. 8 is an exemplary view showing a configuration for mounting the reinforcing plate according to the first embodiment.

Next, a structure of the reinforcing plate according to the example will be described with reference to FIGS. 6 to 8. FIG. 6 is a typical plan view showing an inner part of a display unit of the portable computer according to the first embodiment. FIG. 7 is a view showing a reinforcing plate according to the first embodiment. FIG. 8 is a view showing the inner part of the display unit of the portable computer according to the first embodiment viewed from a side. Although FIG. 8 shows the configuration of the second heating component 22b and the reinforcing plate 27 for easy understanding of the embodiment, it is a matter of course that the configuration of the second heating component 22a and the reinforcing plate 27 are the same.

The reinforcing plate 27 according to the example is configured over a flat plate which uses, as a material, a metal having a great rigidity and a high thermal conductivity, is similar to a bottom face (a mounting face) of the first heating component 21 and has a greater outer edge dimension than that of the first heating component 21, for example, and has an opening portion 27e formed on a central part.

As shown in FIGS. 6 and 7, the reinforcing plate 27 is attached to surround the first heating component 21 as seen from the first face 11e side of the circuit board 11, and reinforces a mounting part of the first heating component 21 in the circuit board 11 by a rigidity thereof. Even if an external stress is applied to the circuit board 11, consequently, it is possible to suppress a warpage or a deformation of the circuit board 11 in the mounting part of the first heating component 21, and to maintain a reliable junction of the first heating component 21 and the circuit board 11 through a solder ball or a bonding member.

The reinforcing plate 27 according to the example has the opening portion 27e on the central part. If the reinforcing plate 27 has a function for reinforcing the mounting part of the first heating component 21 in the circuit board 11 through the rigidity, however, the opening portion 27e is not always required. Moreover, the reinforcing plate 27 according to the example is configured over the flat plate having the greater outer edge dimension than the outer edge dimension of the first heating component 21. If the reinforcing plate 27 has the function for reinforcing the mounting part of the first heating component 21 in the circuit board 11 through the rigidity, however, the shape does not need to be the flat plate but a section may take a rectangular shape or an arcuate shape, for example.

As shown in FIGS. 6 and 7, the reinforcing plate 27 according to the example has four corner portions 27a, 27b, 27c and 27d, plate portions 27ab, 27bc, 27cd and 27da provided over the corner portions 27a to 27d, holes 27a1, 27b1, 27c1 and 27d1 corresponding to the corner portions 27a to 27d, and extensions 28a and 28b.

The extensions 28a and 28b are extended from the reinforcing plate 27 and are formed integrally with the reinforcing plate 27. The extensions 28a and 28b have radiation units 28a1 and 28b1, and connecting portions 28a2 and 28b2 which are provided over the extensions 28a and 28b and the radiation units 28a1 and 28b1.

As shown in FIG. 8, the radiation units 28a1 and 28b1 include heat receiving faces 28a3 and 28b3 which are opposed to the second heating components 22a and 22b and are thermally connected to the second heating components 22a and 22b. The heat receiving faces 28a3 and 28b3 are separated from the second face 11b of the circuit board 11 each other with gaps which are equal to or greater than mounting heights of the second heating components 22a and 22b, and are thermally connected to the second heating components 22a and 22b through a grease or a heat transferring sheet, for example, or directly.

By this configuration, in the portable computer 1 according to the example, it is possible to transmit the heat from the second heating components 22a and 22b to the radiation units 28a1 and 28b1, thereby cooling the second heating components 22a and 22b. The reinforcing plate 27 according to the example is configured by a metallic material having a high thermal conductivity. Therefore, the radiation units 28a1 and 28b1 connected thermally to the reinforcing plate 27 can efficiently radiate heat in larger surface areas.

In the radiation units 28a1 and 28b1 according to the example, it is assumed that thicknesses Sa and Sb corresponding to the mounting heights of the second heating components 22a and 22b are properly employed. In the connecting portions 28a2 and 28b2 according to the example, moreover, it is assumed that tilt angles $\theta a$ and $\theta b$ corresponding to the mounting heights of the heating components 22a and 22b are properly employed. The "thickness" indicates a thickness of a member which is employed most widely in the member.

In the example, the radiation units 28a1 and 28b1 are thermally connected to the same heat pipe 14. By the structure, it is possible to cause a height of an abutment on the heat pipe 14 to be uniform by regulating the thicknesses Sa and Sb of the radiation units 28a1 and 28b1 and the tilt angles θa and θb of the connecting portions 28a2 and 28b2. Thus, it is possible to prevent an abutting surface on the heat pipe 14 between the radiation units 28a1 and 28b1 from being ununiform or to prevent a load from being applied to the heat pipe 14.

In the circuit board 11 according to the example, there are provided through holes (not shown) corresponding to the holes 27a1 to 27d1 and formed over the first face 11a and the second face 11b in the circuit board 11. The leg portion 26b in the fixture 26 of the first heating component 21 is fastened and fixed to the holes 27a1 to 27d1 of the reinforcing plate 27 with screws via the through holes, respectively. In the example, moreover, the holes 27b1 and 27d1 of the reinforcing plate 27 are shared by the fixtures 26 of the heating components 21 and 22a, respectively. More specifically, as shown in FIG. 7, a screw (not shown) corresponding to the leg portion 26b in the fixture 26 of the first heating component 21 is fitted in the holes 27b1 and 27d1 of the reinforcing plate 27 from the first face 11a side of the circuit board 11, and a screw corresponding to the leg portion 26b in the fixture 26 of the second heating component 22a is fitted therein from the second face 11b side. By this configuration, in the portable computer 1 according to the example, it is possible to obtain high density mounting of the components accommodated in the housing and to reduce the fixtures such as the screws.

Next, description will be given to workings of the portable computer 1.

By using the portable computer 1, the first and second heating components 21, 22a and 22b generate heat. The heat generated by the first heating component 21 is transferred to the first radiation member 15 through the heat receiving block 24 by means of the first heat pipe 13. The heat generated by the second heating components 22a and 22b is transferred to the second radiation member 16 through the radiation units 28a1 and 28b1 by means of the second heat pipe 14.

When the cooling fan 12 is driven, air is discharged from the vent 12b so that the first and second radiation members 15 and 16 are forcibly cooled. The heat moved from the heating components 21, 22a and 22b to the first and second radiation members 15 and 16 is transmitted to the air discharged from the cooling fan 12 and is discharged to the outside of the housing 6 via the vent hole 28. Consequently, the first and second heating components 21, 22a and 22b are promoted to be cooled.

According to the portable computer 1 having the configuration, the heating components 21, 22a and 22b can be cooled, and furthermore, can be mounted at a high density. More specifically, the heat pipes 13 and 14 are attached to the heating components 21, 22a and 22b mounted separately on the front and the back face in the circuit board 11 respectively, and the radiation members 15 and 16 to which the heat pipes 13 and 14 are connected are gathered in one place to cool the single cooling fan 12, for example. Consequently, the heating components 21, 22a and 22b can be promoted to be cooled.

In the example, moreover, the reinforcing plate 27 having a thermal conductivity and serving to reinforce the mounting region of the heating component 21 is thermally connected to the radiation units 28a1 and 28b1 for discharging the heat of the heating components 22a and 22b. By this configuration, it is possible to enhance a cooling efficiency by utilizing the reinforcing plate 27 as a part of a cooling structure.

By separately mounting the heating components 21, 22a and 22b on the front and the back face in the circuit board 11, it is possible to prevent the first heat pipe 13 and the second heat pipe 14 from being adjacent to each other along one of the faces of the circuit board 11. In other words, it is possible to reduce a necessity for considering a space required for arranging the heat pipe. Thus, it is possible to dispose the first heating component 21 and the second heating components 22a and 22b over the back and the front in close positions to each other. Consequently, it is possible to mount the heating components 21, 22a and 22b at a high density.

If the heating components 21, 22a and 22b can be disposed close to each other, the number of places in which a temperature is raised in the circuit board 11 can be reduced. Thus, it is possible to achieve a layout having a high cooling efficiency. For example, the heating components 21, 22a and 22b can be intensively mounted below the keyboard 7 which a user does not touch to keep away from a portion provided below a palm rest 33 which the user touches, for example.

When it is avoided to dispose the first heat pipe 13 and the second heat pipe 14 adjacent to each other along one of the faces of the circuit board 11, the heat pipes can be more freely arranged. This contributes to the fact that the heat pipes 13 and 14 are arranged in the housing 6 having a space limited. For example, both of the first and second heat pipes and 14 are extended along the same side face 12c of the cooling fan 12. The two heat pipes 13 and 14 are provided around the cooling fan 12 in the same direction, resulting in a contribution to the fact that the heat pipes 13 and 14 are arranged in the housing 6 having the space limited. In other words, this contributes to a reduction in a size of the portable computer 1.

For example, in order to use the keyboard 7 with a rear-upward tilt (that is, with a height increased with distance from the user), some users utilize the portable computer 1 with the rear-upward tilt. When the portable computer 1 according to the embodiment is tilted with the rear-upward tilt, the first and second radiation members 15 and 16 are positioned in an upper part in a vertical direction as compared with the first and second heating components 21, 22a and 22b. More specifically, both of the first and second heat pipes 13 and 14 are brought into a bottom heat state in which the heat receiving portions 13a, 14a and 14b are positioned in lower parts and the radiation units 13b and 14b are positioned in upper parts. The heat pipe has a higher heat transfer efficiency in the bottom heat state as compared with a top heat state based on the operating principle of utilizing capillary.

By disposing either of the first and second radiation members 15 and 16 which needs to be cooled more on the peripheral wall side of the housing 6 having an opening formed thereon, moreover, it is possible to efficiently radiate the heat.

According to the portable computer 1 in accordance with the embodiment, the two heat pipes 13 and 14 can be provided around the cooling fan 12 in the same direction. Therefore, it is possible to perform a layout design in such a manner that both of the heat pipes 13 and 14 are brought into the bottom heat state.

If the first and second radiation members 15 and 16 are longitudinally arranged in the air flowing direction from the cooling fan, it is possible to effectively cool the two radiation members 15 and 16 by the single cooling fan 12, for example.

By disposing the cooling fan 12 side by side with the circuit board 11 in a parallel direction with the face of the circuit board 11, it is possible to suppress a mounting height of a whole module disposed in the housing 6. More specifically, as compared with the case in which the cooling fan 12 is provided on the circuit board 11, it is possible to reduce a thickness of the housing 6. Although the description has been given to the example in which the first and second heat pipes 13 and 14 according to the example are connected to the first and second radiation members 15 and 16 respectively, the invention is not restricted thereto but they may be connected to the same radiation member. By this configuration, it is possible to implement a reduction in the size of the housing 6 and an increase in the size of the circuit board 11.

Although the description has been given by taking the first heating component 21 as an example, it is sufficient to use a surface type mounting component having a mounting region reinforced by the reinforcing plate 27 or it is also possible to use a component which does not generate heat.

Although the description has been given to the example in which the reinforcing plate 27 is provided on the face 11b positioned at an opposite side to the face 11a on which the first heating component 21 is provided in the example, moreover, it is sufficient that the reinforcing plate 27 serves to reinforce the mounting region of the first heating component 21. Therefore, they may be provided on the same face. In this case, an inner edge dimension of the opening portion 27e of the reinforcing plate 27 is designed to be greater than the outer edge dimension of the first heating component 21 in order to surround the mounting region of the first heating component 21. By this configuration, it is possible to implement higher density mounting of the electronic component at either side of the circuit board. In the example, even if heating units are provided densely, it is possible to efficiently carry out a cooling treatment for each of the heating units by using the cooling structure utilizing the reinforcing plate 27.

Although the description has been given to the example in which the radiation units 28a1 and 28b1 are separated from each other in the example, furthermore, the invention is not restricted thereto but it is also possible to couple at least a part of the radiation unit 28a1 to at least a part of the radiation unit 28b1, thereby increasing a radiation area.

In the example, the radiation units 28a1 and 28b1 are provided. Consequently, it is possible to cool a plurality of heating components mounted around the reinforcing plate 27.

Figure 9:
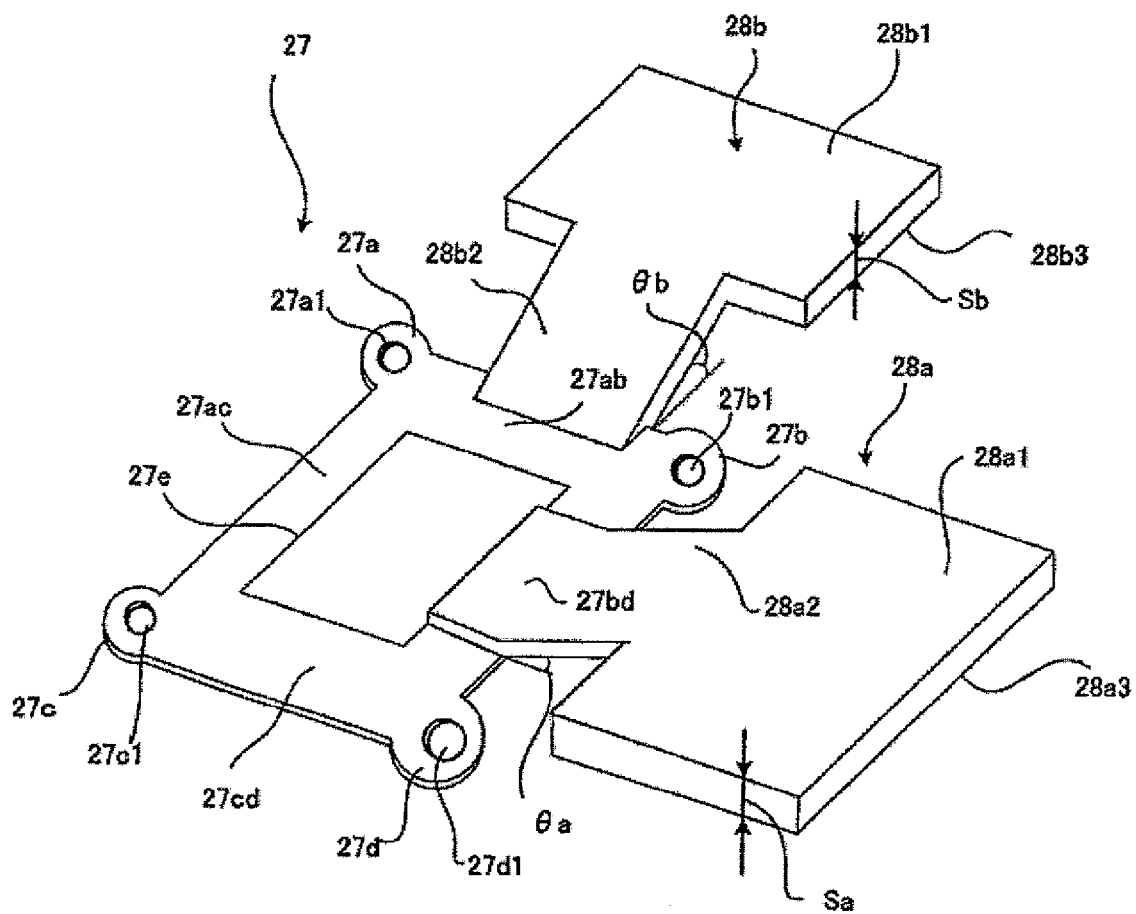
FIG. 9 is an exemplary view showing a reinforcing plate according to a second embodiment.

Next, a portable computer 1 serving as an electronic apparatus according to a second embodiment of the invention will be described with reference to FIG. 9. FIG. 9 is a view showing a reinforcing plate according to the second embodiment. Configurations having identical or similar functions to the portable computer according to the first embodiment have the same reference numerals and description thereof will be omitted. In the second embodiment, a shape of a reinforcing plate 27 is different from that in the first embodiment. The portable computer 1 according to the second embodiment has almost the same appearance as that shown in FIG. 1.

A housing 6 of the portable computer 1 according to the second embodiment accommodates a circuit board 11, first and second heating components 21, 22a and 22b, and the reinforcing plate 27. The reinforcing plate 27 and radiation units 28a1 and 28b1 according to the second embodiment are configured as separate members, respectively. They contribute to an enhancement in a manufacturing property and a reduction in a cost for the portable computer 1.

By this configuration, it is possible to implement the structure of the reinforcing plate 27 according to the first embodiment more simply and to obtain the same advantages as those of the reinforcing plate 27 according to the first embodiment.

With the configuration according to the second embodiment, moreover, it is sufficient that the radiation units 28a1 and 28b1 configured as the separate members have a thermal conductivity, and the reinforcing plate 27 does not need to always have a high thermal conductivity. For example, in the case in which the reinforcing plate 27 is configured by a material such as a resin having a rigidity and a low thermal conductivity, it is possible to prevent heat from being transferred from the radiation units 28a1 to 28b1 to the circuit board 11.

In the second embodiment, thus, it is possible to hold the radiation units 28a1 and 28b1 by utilizing a mounting configuration of the reinforcing plate 27.

Figure 10:
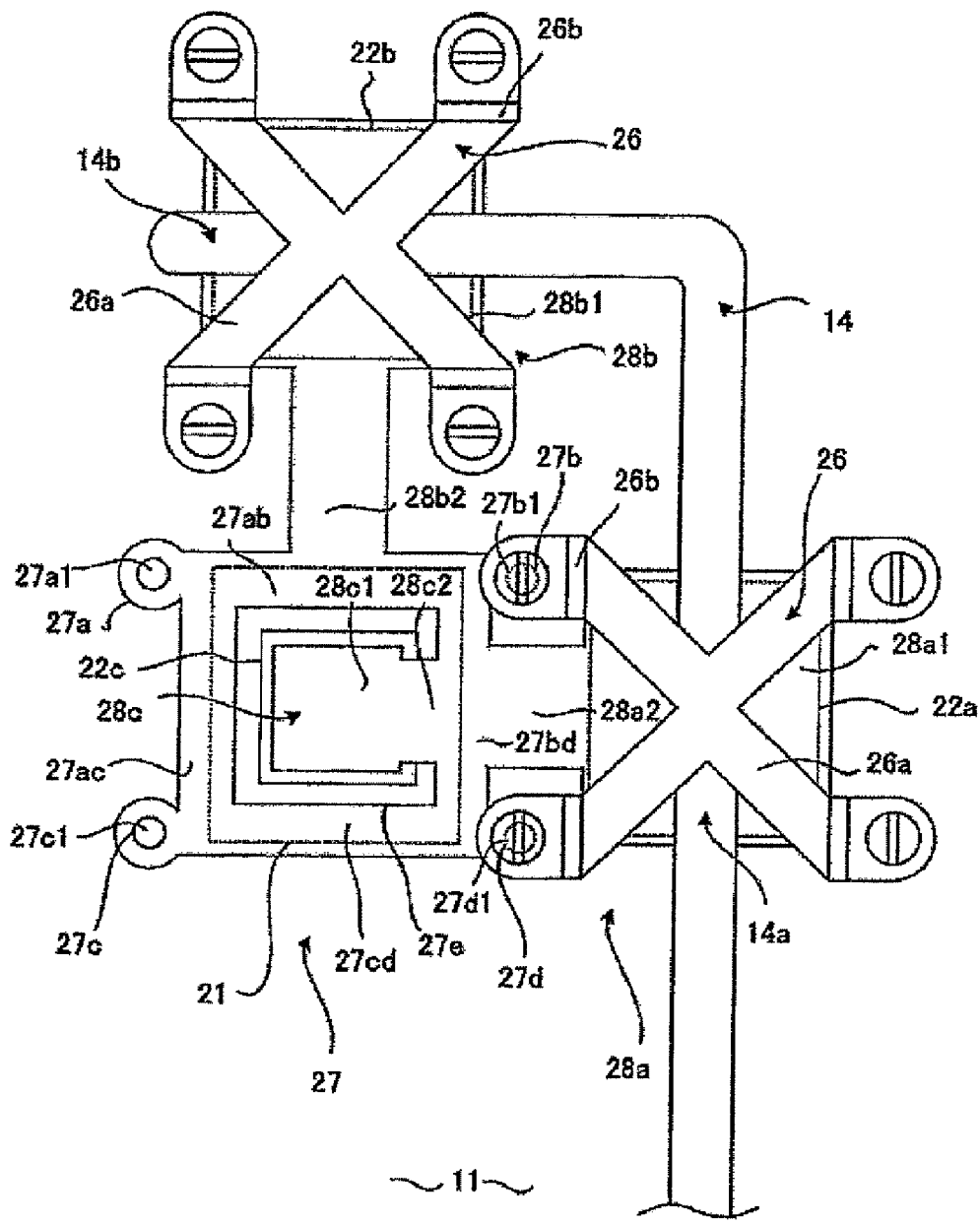
FIG. 10 is an exemplary typical plan view showing an inner part of a display unit of a portable computer according to a third embodiment.
Figure 11:
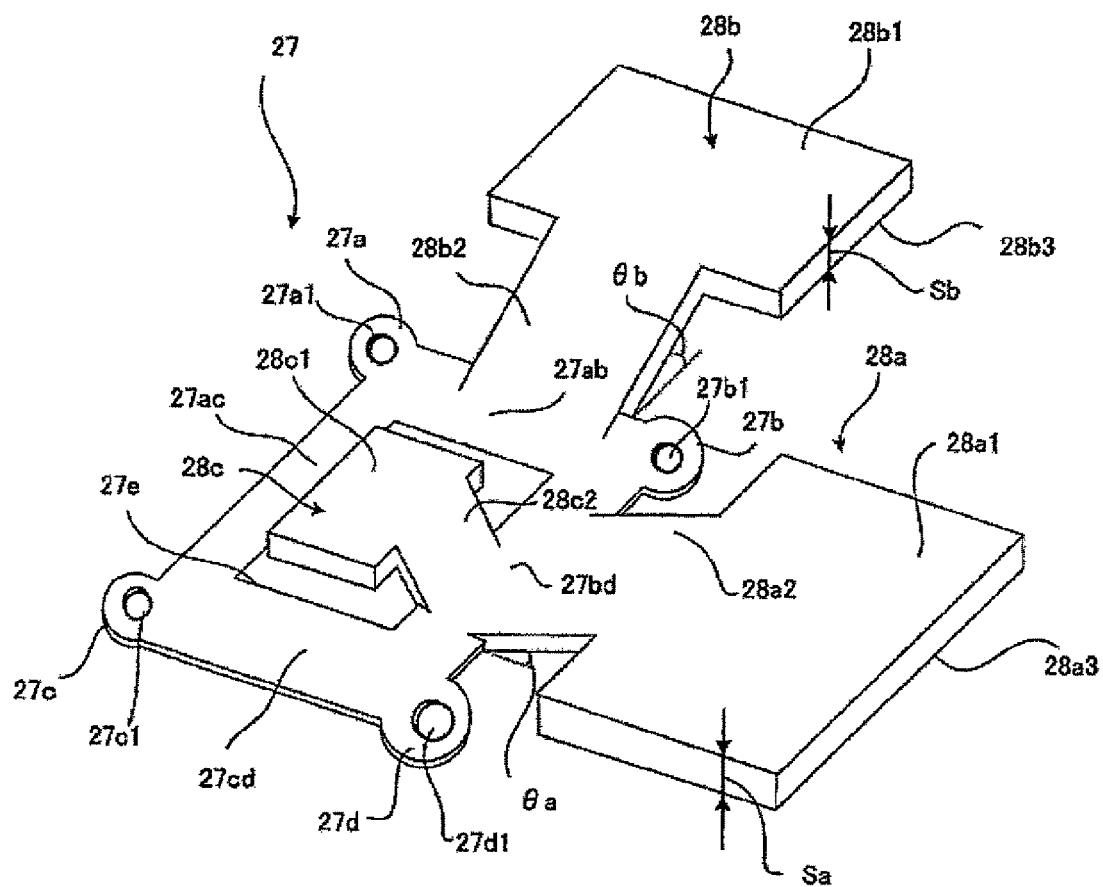
FIG. 11 is an exemplary view showing a reinforcing plate according to the third embodiment.

Next, a portable computer 1 serving as an electronic apparatus according to a third embodiment of the invention will be described with reference to FIGS. 10 and 11. FIG. 10 is a typical plan view showing an inner part of a display unit in the portable computer according to the third embodiment. FIG. 11 is a view showing a reinforcing plate according to the third embodiment.

Configurations having the identical or similar functions to those of the portable computer according to the first embodiment have the same reference numerals and description thereof will be omitted. In the third embodiment, a shape of a reinforcing plate 27 is different from that in the first embodiment. The portable computer 1 according to the third embodiment has almost the same appearance as that shown in FIG. 1.

In a housing 6 of the portable computer 1 according to the third embodiment, for example, a third heating component 22c is mounted on a second face 11b of a circuit board 11, that is, a region in an opening portion 27e of the reinforcing plate 27 in addition to the circuit board 11, a cooling fan 12, first and second heat pipes 13 and 14, and first and second radiation members 15 and 16. The third heating component 22c has a large heating amount in circuit components mounted on the circuit board 11 similarly to the first and second heating components 21, 22a and 22b, for example.

Moreover, the reinforcing plate 27 according to the third embodiment has a radiation unit 28c1 corresponding to the third heating component 22c. The radiation unit 28c1 is thermally connected to the reinforcing plate 27 in the same manner as the radiation units 28a1 and 28b1. By this configuration, it is possible to implement higher density mounting of housing accommodated components, and furthermore, to obtain the same advantages as those of the portable computer 1 according to the first embodiment.

Figure 12:
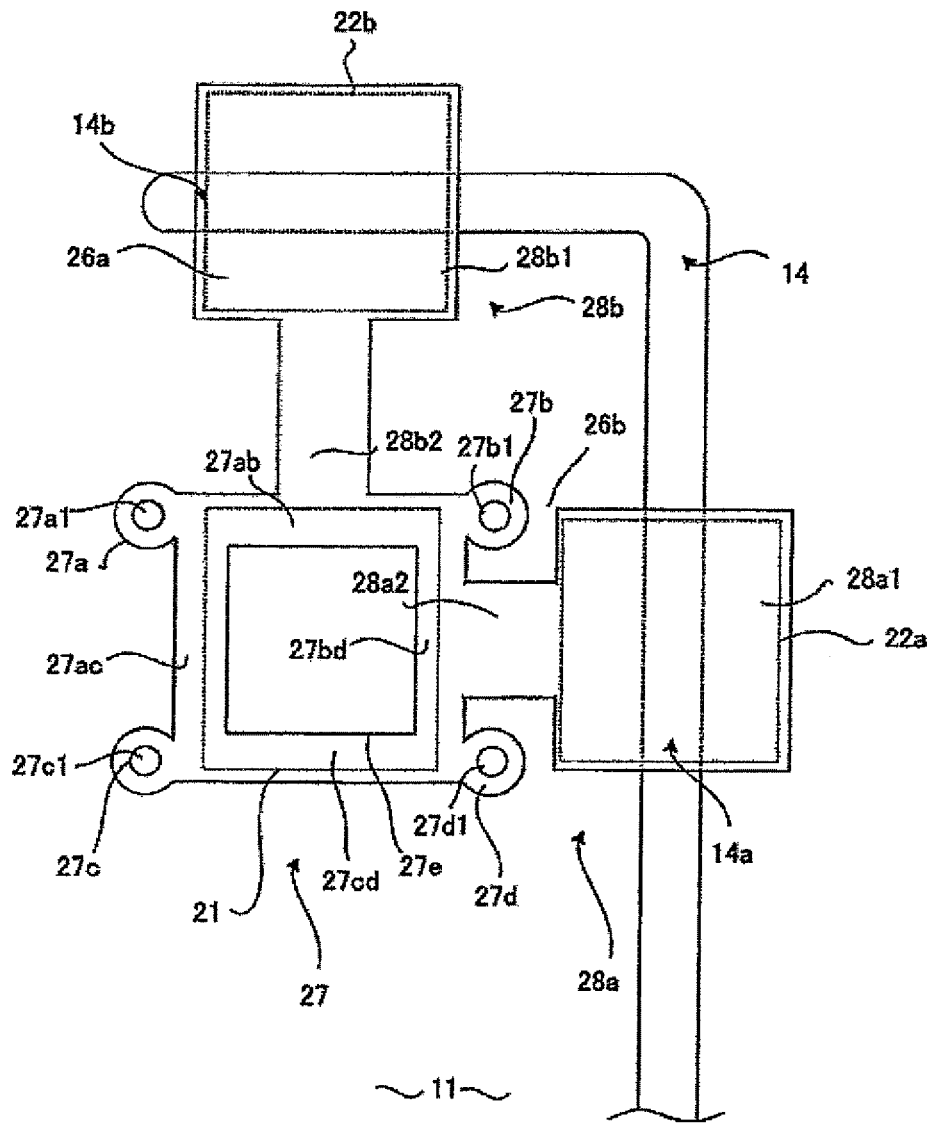
FIG. 12 is an exemplary typical plan view showing an inner part of a display unit of a portable computer according to a fourth embodiment.
Figure 13:
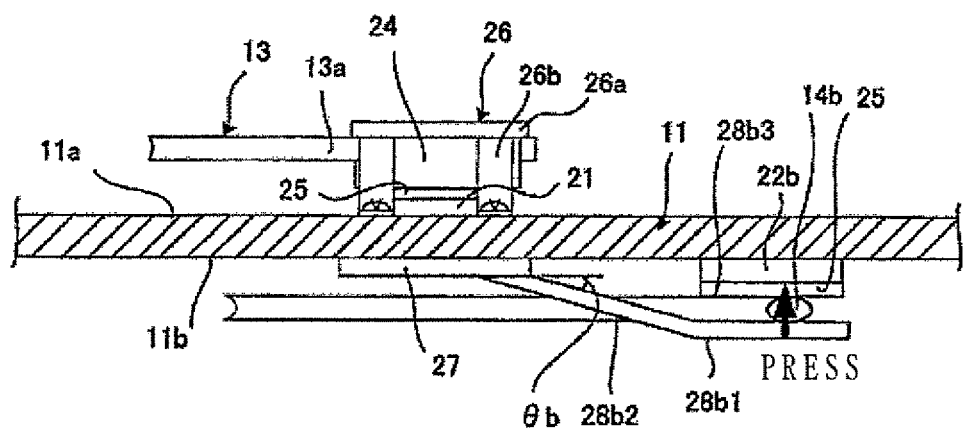
FIG. 13 is an exemplary view showing the inner part of the display unit of the portable computer according to the fourth embodiment viewed from a side.

Next, a portable computer 1 serving as an electronic apparatus according to a fourth embodiment of the invention will be described with reference to FIGS. 12 and 13. FIG. 12 is a typical plan view showing an inner part of a display unit in the portable computer according to the fourth embodiment. FIG. 13 is a view showing the inner part of the display unit in the portable computer according to the fourth embodiment as viewed from a side face. Although FIG. 13 shows configuration of a second heating component 22b and a reinforcing plate 27 for easy understanding of the embodiment, it is a matter of course that the configuration of a second heating component 22a and the reinforcing plate 27 are also the same.

Configurations having the identical or similar functions to those of the portable computer according to the first embodiment have the same reference numerals and description thereof will be omitted. In the fourth embodiment, mounting positions of radiation units 28a1 and 28b1 are different from those in the first embodiment. The portable computer 1 according to the fourth embodiment has almost the same appearance as that shown in FIG. 1.

In the fourth embodiment, a heat pipe 14 is provided between the radiation units 28a1 and 28b1 and the second heating components 22a and 22b. As described above, since the radiation units 28a1 and 28b1 according to the example are held on the reinforcing plate 27 through connecting portions 28a2 and 28b2 respectively, they can fulfill the same function as a so-called cantilever-shaped spring. Therefore, an interval between a face of a circuit board and the radiation units 28a1 and 28b1 is regulated to serve as a fixing member 26. Thus, the heat pipe 14 can be fixed to the second heating components 22a and 22b.

By the structure, in the example, it is possible to bond the heat pipe 14 to the second heating components 22a and 22b by pressure without using the fixing member 26 for pressing. Therefore, it is possible to reduce the number of the components.

Although the portable computers 1 according to the first to fourth embodiments have been described above, the embodiments according to the invention are not restricted thereto. The components according to the first to fourth embodiments can be properly combined to execute the invention.

For example, the reinforcing plate 27 and the radiation unit 28d according to the third embodiment may be configured as separate members in the same manner as in the second embodiment.

The electronic apparatus according to the invention can be applied to various electronic apparatuses such as a digital camera, a video camera and a personal digital assistant in addition to the portable computer.

What is claimed is:

1. An electronic apparatus comprising:
   a housing;
   a circuit board accommodated in the housing, the circuit board comprising first and second faces located on opposite sides of the circuit board;
   a first electronic component mounted on the first face of the circuit board;
   a reinforcing member contacting the second face of the circuit board and comprising:
     a plurality of corner portions corresponding to corners the first electronic component; and
     a plate portion that connects the corner portions to extend along outer edges of the first electronic component on mounting area and reinforces the circuits board at the mounting area;
   a second electronic component that is mounted on the second face of the circuit board at a position apart from the mounting area of the plate portion;
   a third electronic component that is mounted on the second face of the circuit board at a position apart from the mounting area of the plate portion;
   a first heat receiving portion that is extended from the reinforcing member and thermally connected to the second electronic component; and
   a second heat receiving portion that is extended from the reinforcing member and thermally connected to the third electronic component.

2. The apparatus of claim 1,
   wherein the plate portion has frame shape having a size larger than the first electronic component and an area in which other electronic component is receivable.

3. The apparatus of claim 2,
   wherein the corner portions of the reinforcing member have screw holes thorough which screws are inserted, and
   wherein the first and second heat receiving portions are located at positions more distant from a center of the plate portion than the nearest screw holes.

4. An electronic apparatus comprising:
   a housing;
   a circuit board accommodated in the housing, the circuit board comprising first and second faces located on opposite sides of the circuit board;
   a first electronic component mounted on the first face of the circuit board;
   a reinforcing member contacting the second face of the circuit board and comprising:
     a plurality of corner portions corresponding to corners of the first electronic component; and
     a plate portion that connects the corner portions to extend along outer edges of the first electronic component on mounting area and reinforces the circuit board at the mounting area;
   a second electronic component that is mounted on the second face of the circuit board at a position apart from the mounting area of the plate portion; and
   a heat receiving portion that is extended from the reinforcing member and thermally connected to the second electronic component.

5. The apparatus of claim 4,
   wherein the heat receiving portion comprises a first end that is connected to the reinforcing member and a second end opposite to the first end and positioned apart from the reinforcing member and the circuit board.

6. The apparatus of claim 4,
   wherein the plate portion has frame shape having a size larger than the first electronic component and an area in which other electronic component is receivable.

7. The apparatus of claim 6,
   wherein the corner portions of the reinforcing member have screw holes thorough which screws are inserted, and
   wherein the heat receiving portion is located at positions more distant from a center of the plate portion than the nearest screw holes.

8. The apparatus of claim 7,
   wherein the second electronic component is mounted on the circuit board to have a first height from the circuit board, and
   wherein the heat receiving portion is located at a position having a second height from the circuit board, the second height being larger than the first height.

9. The apparatus of claim 8,
   wherein the reinforcing member is configured to have a first thickness, and
   wherein the heat receiving portion is configured to have a second thickness that is different from the first thickness.

* * * * *